US012644903B2

(12) United States Patent
Kohno et al.

(10) Patent No.: US 12,644,903 B2
(45) Date of Patent: Jun. 2, 2026

(54) EVALUATION APPARATUS, EVALUATION METHOD, AND NON-TRANSITORY COMPUTER READABLE MEDIUM

(71) Applicant: NEC Corporation, Tokyo (JP)

(72) Inventors: Wataru Kohno, Tokyo (JP); Sakiko Mishima, Tokyo (JP); Tomoyuki Hino, Tokyo (JP); Takashi Matsushita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 18/484,078

(22) Filed: Oct. 10, 2023

(65) Prior Publication Data

US 2024/0133910 A1     Apr. 25, 2024

(30) Foreign Application Priority Data

Oct. 18, 2022    (JP) ................................ 2022-167111

(51) Int. Cl.
    *G01P 5/00*       (2006.01)
(52) U.S. Cl.
    CPC ...................................... *G01P 5/00* (2013.01)
(58) Field of Classification Search
    CPC .............. G01P 13/02; G01P 5/00; G01P 5/02
    See application file for complete search history.

(56) References Cited

U.S. PATENT DOCUMENTS

| | | | | |
|---|---|---|---|---|
| 2016/0341757 A1* | 11/2016 | Masucci | ................ | G01P 5/245 |
| 2018/0246138 A1* | 8/2018 | Holtom | ................ | G01S 13/956 |
| 2021/0172767 A1* | 6/2021 | Yoda | ...................... | G01H 9/004 |
| 2023/0098933 A1* | 3/2023 | Arioka | ................ | G02B 6/4422 |
| | | | | 73/657 |

FOREIGN PATENT DOCUMENTS

| | | | | |
|---|---|---|---|---|
| CN | 113049909 A | * | 6/2021 | ............ G01H 9/004 |
| JP | 2011-085540 A | | 4/2011 | |

* cited by examiner

*Primary Examiner* — Yoshihisa Ishizuka
(74) *Attorney, Agent, or Firm* — Sughrue Mion, PLLC

(57) ABSTRACT

An evaluation apparatus according to the present disclosure includes at least one memory storing a set of instructions, and at least one processor configured to execute the set of instructions and thereby to acquire, from a sensor, time-space data on vibrations that have occurred in an overhead optical fiber strung between poles, and evaluate, for each of predetermined analysis sections, a wind velocity and a propagation speed of wind in the analysis section based on the time-space data, and evaluate a wind direction in the analysis section based on the evaluated wind velocity and the propagation speed of the wind.

18 Claims, 13 Drawing Sheets

$$v1/v2 \approx 0$$

EVALUATION APPARATUS, EVALUATION METHOD, AND NON-TRANSITORY COMPUTER READABLE MEDIUM

INCORPORATION BY REFERENCE

This application is based upon and claims the benefit of priority from Japanese patent application No. 2022-167111, filed on Oct. 18, 2022, the disclosure of which is incorporated herein in its entirety by reference.

TECHNICAL FIELD

The present disclosure relates to an evaluation apparatus, an evaluation method, and a non-transitory computer readable medium.

BACKGROUND ART

It is possible to detect vibrations occurring at an arbitrary section of an optical fiber by using a technique called optical fiber sensing. Specifically, in the optical fiber sensing, an optical fiber sensor inputs coherent pulsed light to an optical fiber and receives its backscattered light from the optical fiber. In this process, the optical fiber sensor detects a phase difference between backscattered light generated at two points on the optical fiber, and thereby detects vibrations occurring in a phase difference evaluation section (gauge length section), which is the section between the aforementioned two points, on the optical fiber. Such an optical fiber sensor is implemented by, for example, a phase-sensitive OTDR (Phase-Sensitive Optical Time Domain Reflectometer) or a DAS (Distributed Acoustic Sensor), and the following description will be given based on the assumption that the optical fiber sensor is a DAS.

Further, in some cases, an existing communication optical fiber cable containing optical fibers is laid in a place away from the Earth's surface. Examples of such communication optical fiber cables include overhead optical fiber cables strung between poles such as electric poles and steel towers and OPGWs (Optical Ground Wires).

Further, a DAS can detect an environment and/or an abnormality around an optical fiber based on information indicating vibrations occurring in the optical fiber. Examples of environments around optical fibers include rain and lightning. Further, examples of abnormalities include unusual noises.

It should be noted that information about wind such as information about a wind direction and a wind velocity is one of the most important indices of weather information. Therefore, if it is possible to evaluate a wind direction and a wind velocity by using an overhead optical fiber strung between poles, it then becomes possible to monitor a wide range of environmental changes caused by some weather changes in a highly densified manner.

For example, if it is possible to evaluate a wind direction and a wind velocity, it then becomes possible to, when strong wind such as a typhoon is detected, send alerts to local places where strong wind has occurred. In this case, examples of destinations to which an alert is sent include vehicles and railways traveling in places where strong wind is occurring, and aircraft flying near such places.

Further, if it is possible to evaluate a wind direction and a wind velocity, it can contribute to monitoring of conditions of transmission lines. For example, if strong wind is detected in a state in which snow or ice is deposited on a transmission line, it becomes possible to send an alert for warning a manager who manages the transmission line of a galloping phenomenon. Further, in the case where a transmission line is maintained and monitored by using a drone, information about a wind direction and a wind velocity can be used as reference information.

Therefore, recently, technologies for detecting and measuring wind by using optical fibers have been proposed. For example, in a technology disclosed in Japanese Unexamined Patent Application Publication No. 2011-085540, a special optical fiber cable which includes an optical fiber, a low-resistance metal wire, and a high-resistance metal wire, and in which a notch and a connection fitting are provided is used. The optical fiber cable generates heat when electric power is supplied to the low-resistance metal wire. In this state, changes in temperature over time are measured based on changes in intensity of Raman scattering light contained in backscattered light generated inside the optical fiber over time, and then a wind velocity is detected based on the measured changes in temperature over time.

However, in the technology disclosed in Japanese Unexamined Patent Application Publication No. 2011-085540, there is a problem that although it is possible to detect a wind velocity, it is not possible to detect a wind direction.

SUMMARY

Therefore, in view of the above-described problem, an object of the present disclosure is to provide an evaluation apparatus, an evaluation method, and a non-transitory computer readable medium capable of detecting a wind direction.

An evaluation apparatus according to an aspect includes:
at least one memory storing a set of instructions; and
at least one processor configured to execute the set of instructions and thereby to:
acquire, from a sensor, time-space data on vibrations that have occurred in an overhead optical fiber strung between poles; and
evaluate, for each of predetermined analysis sections, a wind velocity and a propagation speed of wind in the analysis section based on the time-space data, and evaluate a wind direction in the analysis section based on the evaluated wind velocity and the propagation speed of the wind.

An evaluation method according to an aspect is
an evaluation method performed by an evaluation apparatus, including:
acquiring, from a sensor, time-space data on vibrations that have occurred in an overhead optical fiber strung between poles; and
evaluating, for each of predetermined analysis sections, a wind velocity and a propagation speed of wind in the analysis section based on the time-space data, and evaluating a wind direction in the analysis section based on the evaluated wind velocity and the propagation speed of the wind.

A non-transitory computer readable medium according to an aspect is
a non-transitory computer readable medium storing a program for causing a computer to perform:
an acquisition process for acquiring, from a sensor, time-space data on vibrations that have occurred in an overhead optical fiber strung between poles; and
an evaluation process for evaluating, for each of predetermined analysis sections, a wind velocity and a propagation speed of wind in the analysis section based on the time-space data, and evaluating a wind direction in the analysis section based on the evaluated wind velocity and the propagation speed of the wind.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
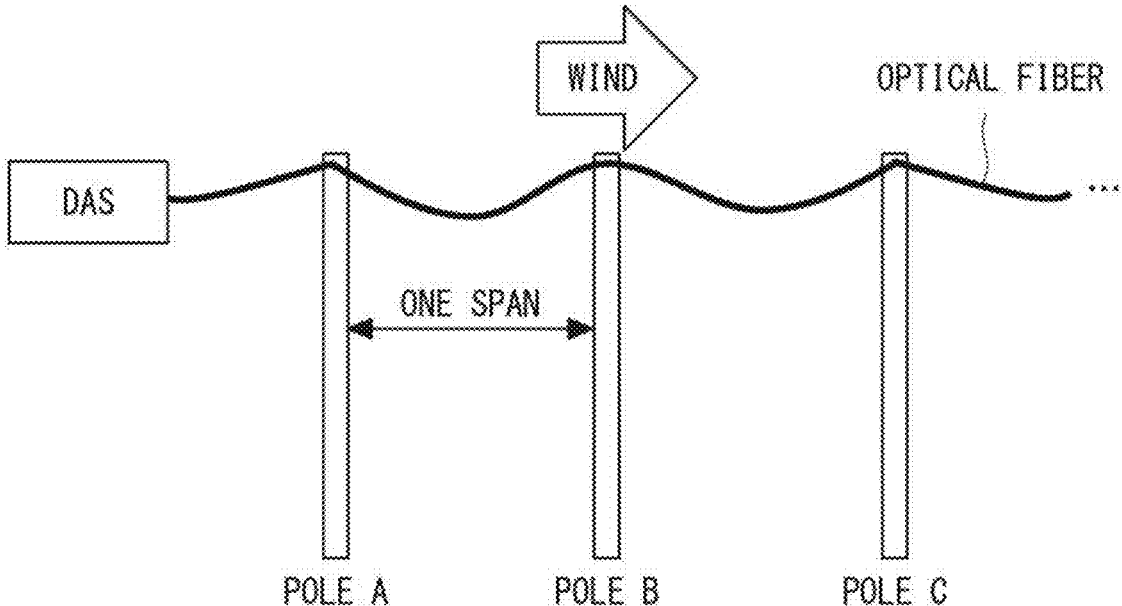
FIG. 1 shows an example of a configuration of a sensing system using an overhead optical fiber strung between poles arranged in a one-dimensional direction.

An example embodiment according to the present disclosure will be described hereinafter with reference to the drawings. Note that the following descriptions and drawings have been omitted and simplified as appropriate for clarifying the explanation. Further, the same reference numerals (or symbols) are assigned to the same elements throughout the drawings, and redundant descriptions thereof are omitted as appropriate. Further, specific numerical values and the like shown below are merely examples for facilitating understanding of the present disclosure, and they are not limited to those shown below.

Prior to describing an example embodiment according to the present disclosure, prerequisites for implementing an example embodiment will be described.

Firstly, an example of a configuration of a sensing system using an overhead optical fiber strung between poles arranged in a one-dimensional direction will be described with reference to FIG. 1.

In the sensing system shown in FIG. 1, an existing optical fiber is suspended from (i.e., strung between) poles A to C, which are, for example, electric poles or steel towers. Further, a DAS (Distributed Acoustic Sensor) is connected to one end of the optical fiber.

The overhead optical fiber strung between the poles is swung by wind, so that vibrations occur. The DAS detects vibrations occurring at each position on the optical fiber. Note that an existing optical fiber and an existing communication optical fiber cable containing an existing optical fiber can be used. Therefore, there is no need to use a special optical fiber cable such as one disclosed in Japanese Unexamined Patent Application Publication No. 2011-085540.

Further, time-space data on vibrations that have occurred in the optical fiber is acquired from the DAS, and a wind velocity and a wind direction are calculated based on the acquired time-space data on vibrations. The time-space data on vibrations is data representing, for each position on the optical fiber, the magnitude of vibrations that have occurred at the position in a chronological manner.

Figure 2:
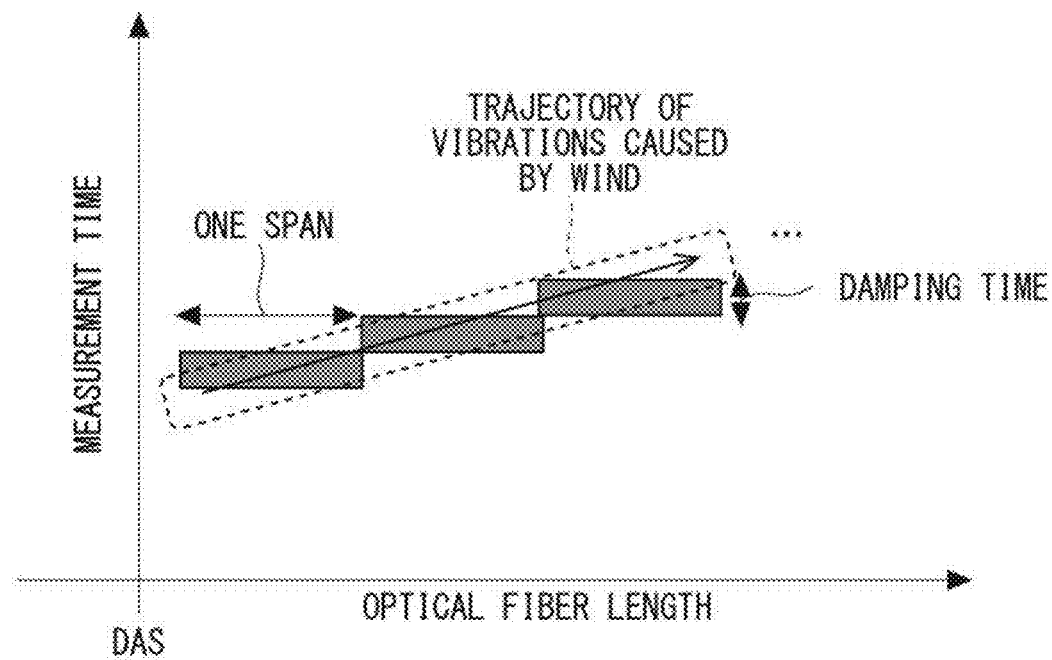
FIG. 2 shows an example of a time-space distribution of vibrations.

Next, an example of a time-space distribution of vibrations obtained from the time-space data on vibrations acquired from the DAS will be described with reference to FIG. 2. The time-space distribution of vibrations shown in FIG. 2 is data representing, for each position on the optical fiber, a time at which vibrations occurred and the magnitude of the vibrations. Note that in FIG. 2, the shade of a line represents the magnitude of vibrations, and the darker the shade of the line is, the larger the magnitude of vibrations is. Further, the horizontal axis indicates the length of the optical fiber measured from the DAS, and the vertical axis indicates the time of the measurement by the DAS (the same applies to FIG. 5, upper part of FIG. 6, upper part of FIG. 7, and FIG. 12 (which will be described later)).

Note that there is a correlation between the vibrations occurring in the overhead optical fiber strung between poles and the wind velocity. For example, when wind is strong, the magnitude of vibrations also increases.

Further, when a distance between neighboring poles between which the optical fiber is strung is defined as one span, vibrations instantaneously propagate over a distance between the poles (i.e., over one span), and the vibrations are dampened over a relatively long time. Therefore, it is possible to evaluate a difference between propagation times of vibrations between the poles.

Further, it is possible to continuously monitor a trajectory of vibrations caused by wind based on a time-space distribution of vibrations like the one shown in FIG. 2. Therefore, it is possible to evaluate a wind direction with respect to the direction in which the optical fiber is laid.

In each of example embodiments according to the present disclosure described below, a wind velocity and a wind direction are evaluated for each of predetermined analysis sections (e.g., for each span between poles) under the above-described prerequisites.

Each of example embodiments according to the present disclosure will be described hereinafter in detail.

First Example Embodiment

Firstly, an example of a configuration of an evaluation apparatus 10 according to a first example embodiment will be described with reference to FIG. 3.

Figure 3:
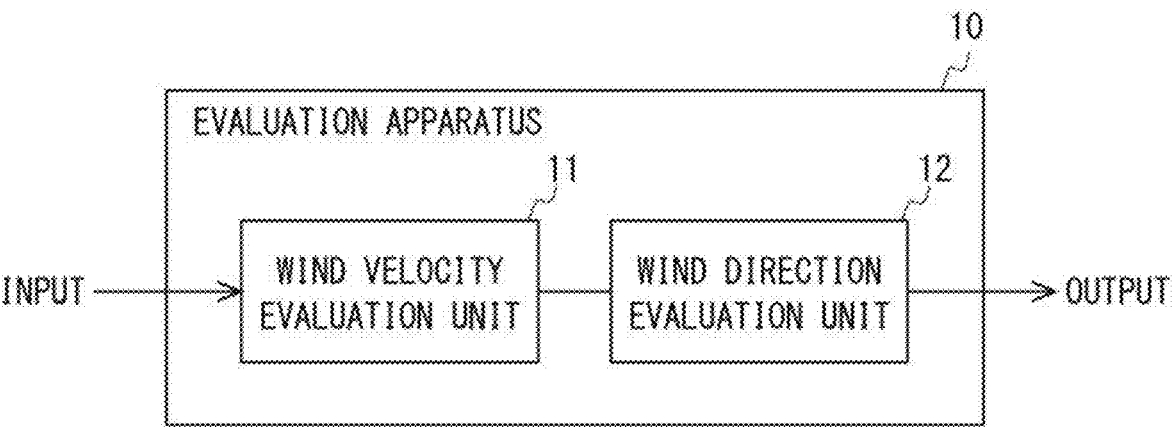
FIG. 3 is a block diagram showing an example of a configuration of an evaluation apparatus according to a first example embodiment.

As shown in FIG. 3, the evaluation apparatus 10 according to the first example embodiment includes a wind velocity evaluation unit 11 and a wind direction evaluation unit 12.

The wind velocity evaluation unit 11 receives (acquires), from the DAS, time-space data on vibrations that have occurred in the optical fiber and have been detected by the DAS. Further, the wind velocity evaluation unit 11 receives (acquires) laying information of the optical fiber (e.g., information as to where the optical fiber is laid) or position information of the poles (i.e., information about the positions of the poles) from which the optical fiber is suspended (i.e., between which the optical fiber is strung). Further, for each span between poles, the wind velocity evaluation unit 11 evaluates the wind velocity in the span based on the magnitude of vibrations occurring in the span. Further, for each span between poles, the wind velocity evaluation unit 11 evaluates the propagation speed of wind in the span based on an arrival time difference of vibrations between two spans on both sides of the span of interest (i.e., a difference between arrival times of vibrations in two spans on both sides of the span of interest).

For each span between poles, the wind direction evaluation unit 12 evaluates the wind direction in the span based on the wind velocity and the propagation speed of the wind in the span. Further, the wind direction evaluation unit 12 outputs information about the wind velocity, the wind direction and the like in each span together with the laying information of the optical fiber or the position information of the poles.

The evaluation apparatus 10 according to the first example embodiment will be described hereinafter in a more detailed manner.

Firstly, an example of a configuration of a sensing system to which the evaluation apparatus 10 according to the first example embodiment is applied will be described with reference to FIG. 4.

Figure 4:
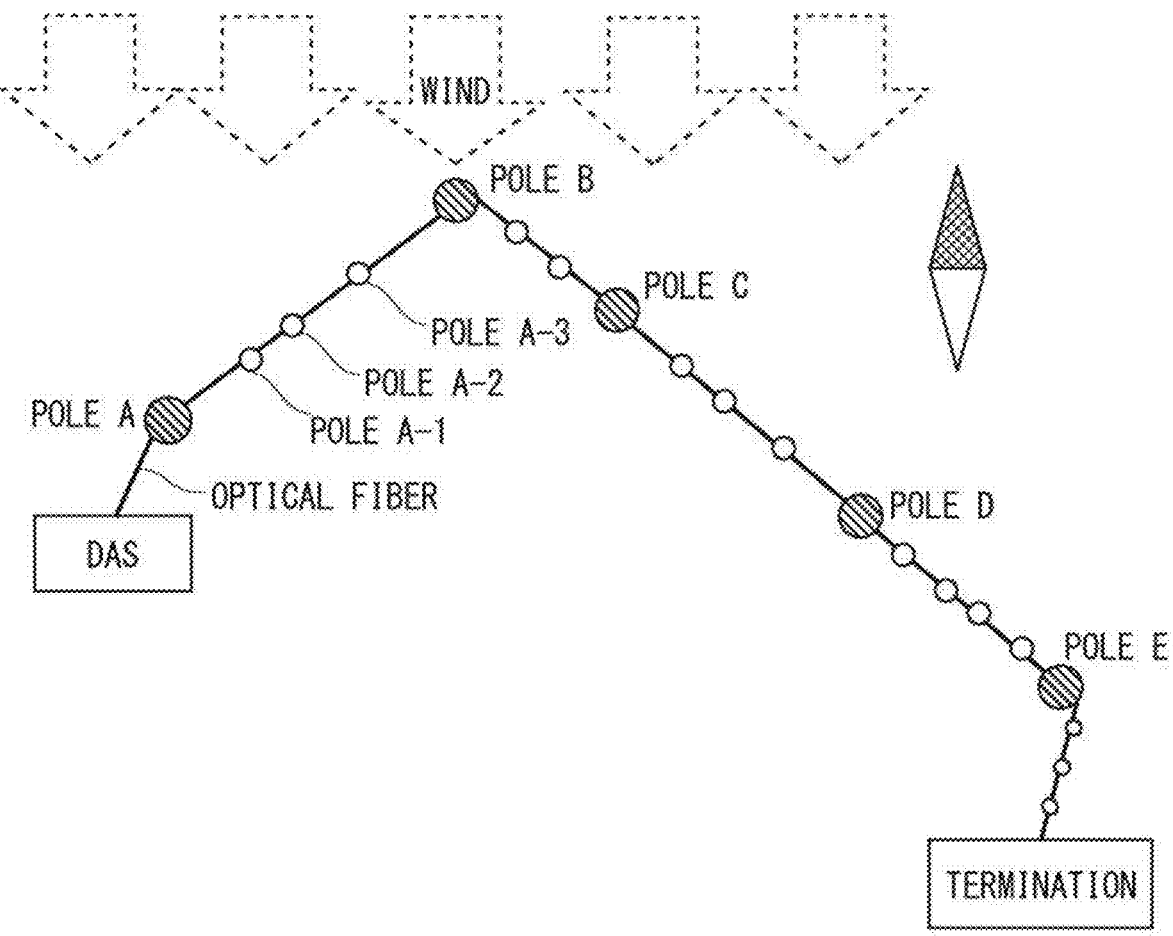
FIG. 4 shows an example of a configuration of a sensing system to which the evaluation apparatus according to the first example embodiment is applied.

In the sensing system shown in FIG. 4, each of the poles A to E includes a closure(s) (a fused part(s) and an extra-length part(s) of the optical fiber). The closure part of the optical fiber is characterized in that the magnitude of vibrations is small and the vibration pattern widely changes as compared to those in the overhead parts of the optical fiber strung between poles.

Further, poles from each of which the optical fiber is suspended by a suspending method in which no extra-length part is provided (e.g., a pole A-1 and the like in the drawing) are provided between the poles each of which includes a closure (e.g., between the poles A and B). That is, the pole A-1 or the like includes no closure.

In the following description, it is assumed that the evaluation apparatus 10 according to the first example embodiment is applied to the sensing system shown in FIG. 4.

Further, it is also assumed that the spatial coordinates of all the poles have already been acquired based on the laying information of the optical fiber or the position information of the poles.

Further, it is also assumed that from the vicinity of the pole B, northerly wind (having a wind direction of 0°) is blowing uniformly over the entire area where the poles A to E are arranged.

Next, an example of a time-space distribution of vibrations that have occurred in the optical fiber, obtained by the evaluation apparatus 10 according to the first example embodiment will be described with reference to FIG. 5. Note that the lower part in FIG. 5 is an enlarged drawing of a time-space distribution of vibrations that have occurred between the pole E and the termination in a certain measurement time period.

Figure 5:
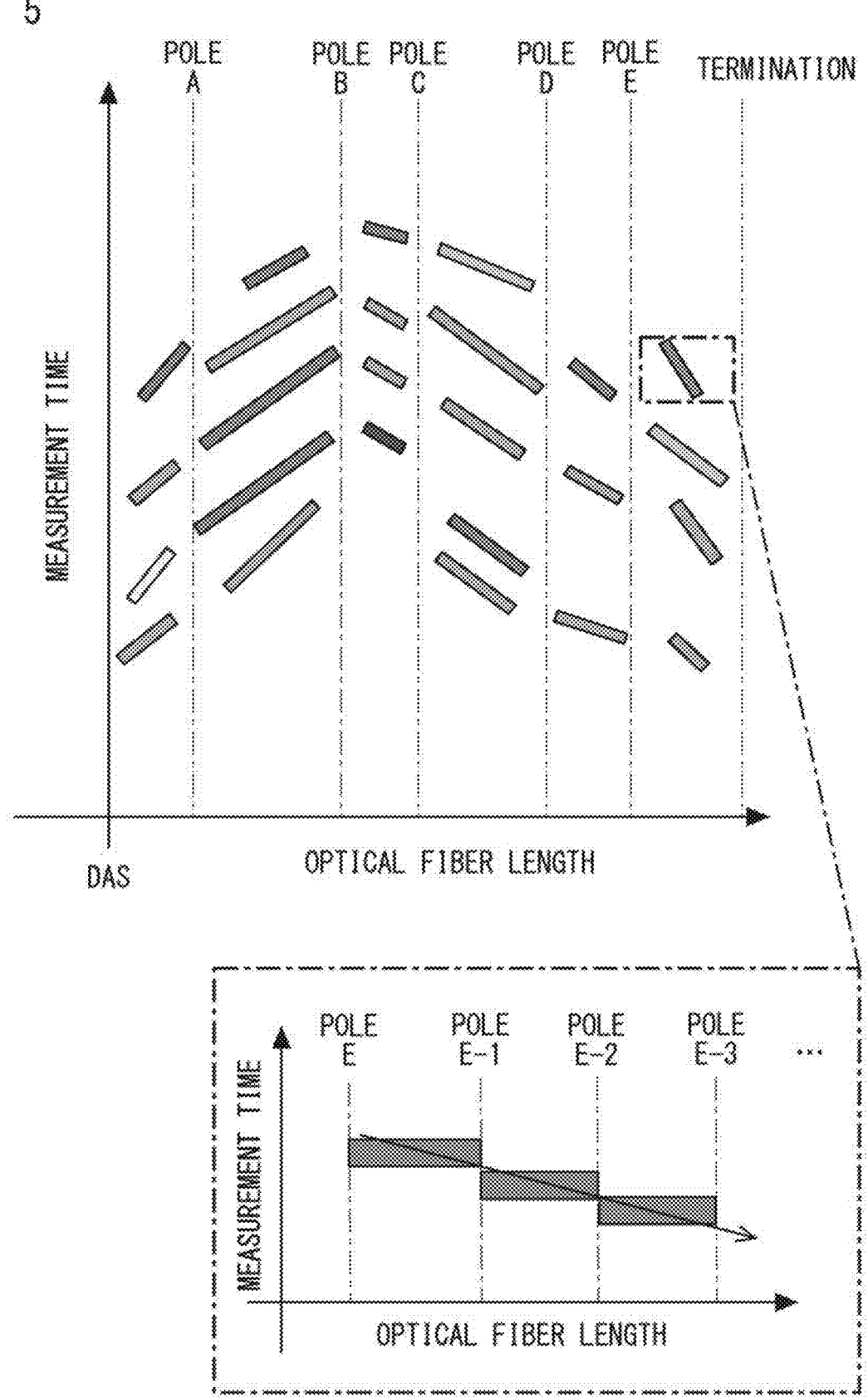
FIG. 5 shows an example of a time-space distribution of vibrations occurring in an optical fiber obtained by the evaluation apparatus according to the first example embodiment.

As shown in FIG. 5, the optical fiber vibrates as wind blows from the vicinity of the pole B toward the other poles.

Further, the vibrations propagate instantaneously (e.g., within one second) over a distance between poles (i.e., over one span), and the vibrations are dampened over a relatively long time (e.g., about 10 to 60 seconds).

Next, an example of operations performed by the wind velocity evaluation unit 11 will be described with reference to FIGS. 6 and 7.

Figure 6:
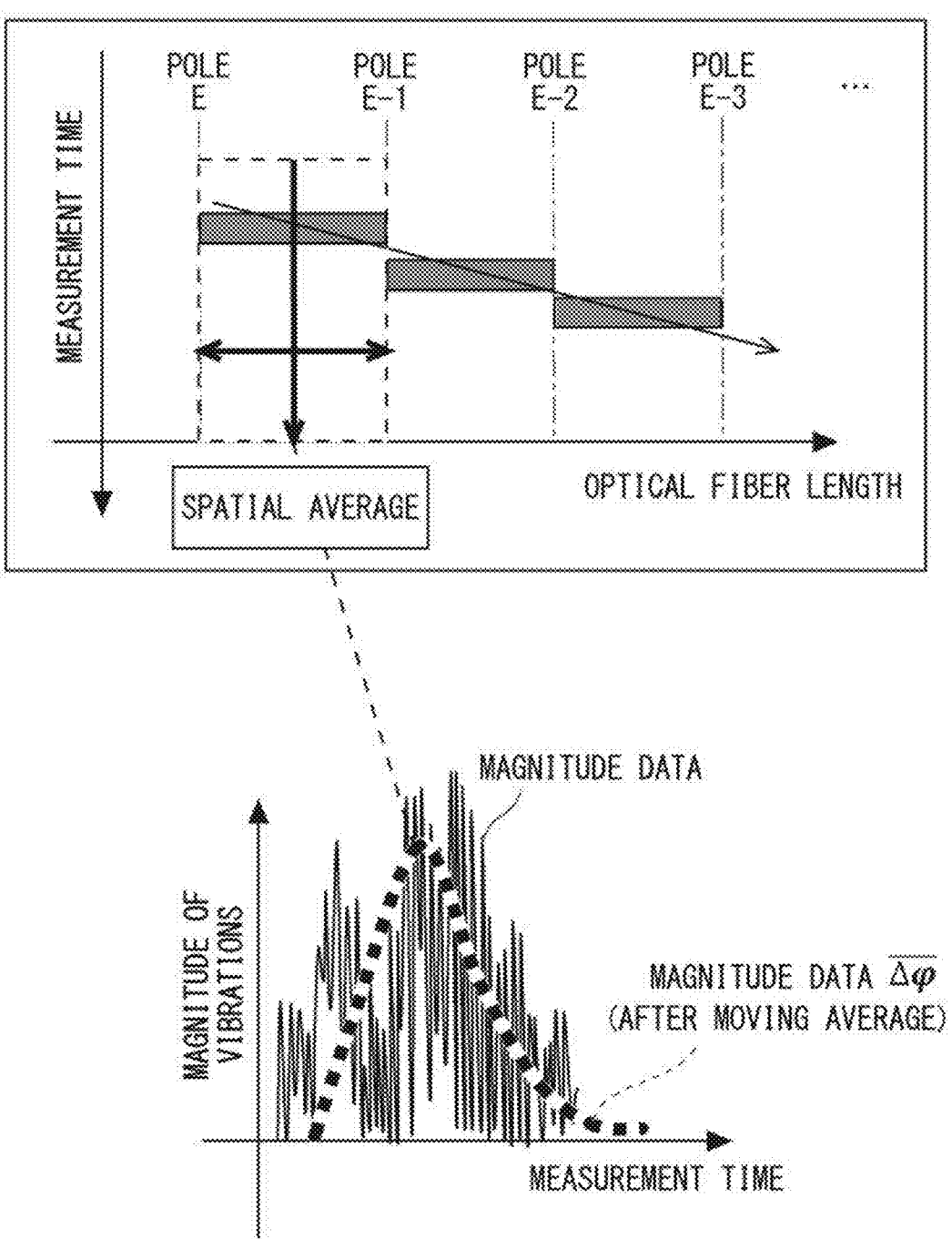
FIG. 6 shows an example of time-space data and a time-space distribution of vibrations occurring in an optical fiber obtained by the evaluation apparatus according to the first example embodiment.

The lower part in FIG. 6 shows an example of time-space data on vibrations that have occurred at a position on the optical fiber corresponding to the center between the poles E and E-1. Note that in the lower part in FIG. 6, the horizontal axis indicates the measurement time by the DAS, and the vertical axis indicates the magnitude of vibrations (the same applies to the lower part of FIG. 7). Further, the upper part of FIG. 6 shows an example of a time-space distribution of vibrations that have occurred between the pole E and the termination in a certain measurement time period.

For each span between poles, the wind velocity evaluation unit 11 smooths the magnitude of vibrations at each position in the span on the optical fiber in the spatial direction and also smooths it in the temporal direction (moving average). In this way, magnitude data $$\overline{\Delta\varphi}$$

is obtained. Note that the order of the smoothing in the spatial direction and the smoothing in the temporal direction (moving average) may be arbitrarily determined. That is, either one of them may be performed before the other.

FIG. 6 is an example in which magnitude data in the span between the poles E and E-1 is obtained.

Note that there is a strong correlation between the magnitude data $$\overline{\Delta\varphi}$$

and the wind velocity.

Therefore, the wind velocity evaluation unit 11 converts the magnitude data $$\overline{\Delta\varphi}$$

into a wind velocity index as shown below.

The wind velocity index may be calculated by using, for example, the below-shown expression.

$$v1 = A \log_{10} B^{\overline{\Delta\varphi}}$$

In the above-described example of the wind velocity index, A and B represent parameters that are unchanged over time. Therefore, it is preferred to calibrate, at an arbitrary time, the parameters A and B by using values obtained by an anemometer located closest to the target measurement point.

The wind velocity evaluation unit 11 evaluates a wind velocity v1 (≥0) in each of all the spans as described above. The wind velocity v1 corresponds to the wind velocity in the target span.

However, the information about the wind direction cannot be obtained by using the wind velocity v1 alone.

Therefore, the wind velocity evaluation unit 11 further performs operations described below.

Figure 7:
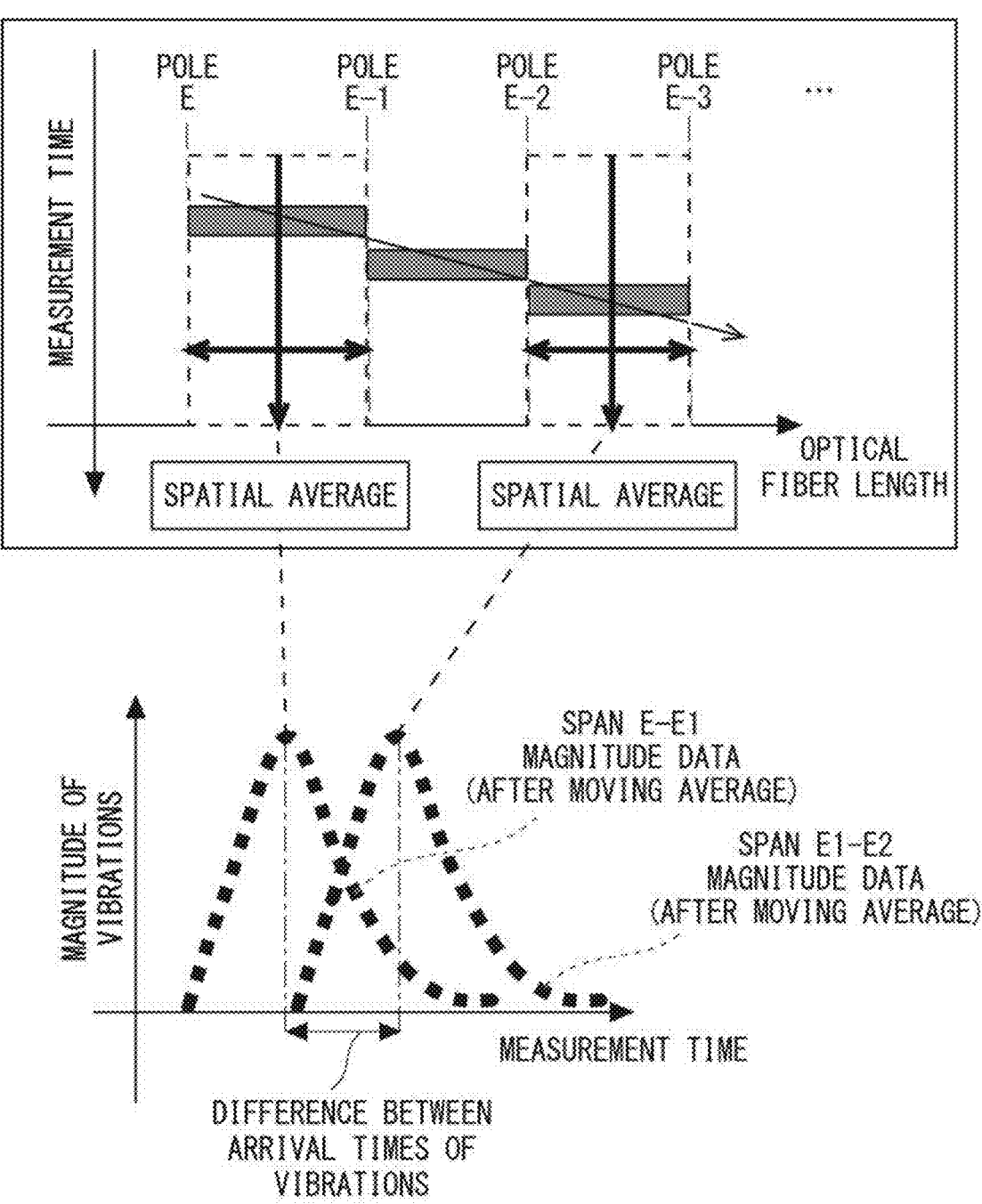
FIG. 7 shows an example of time-space data and a time-space distribution of vibrations occurring in an optical fiber obtained by the evaluation apparatus according to the first example embodiment.

The lower part of FIG. 7 shows an example of time-space data on vibrations that have occurred at the position on the optical fiber corresponding to the center between the poles E and E-1 and that at the position on the optical fiber corresponding to the center between the poles E-2 and E-3. Further, the upper part of FIG. 7 also shows an example of a time-space distribution of vibrations that have occurred between the poles E and the termination in a certain measurement time period.

For each span between poles, the wind velocity evaluation unit 11 selects two spans on both sides of the span of interest, and evaluates an arrival time difference of vibrations between the selected two spans on both sides of the span of interest. The arrival time difference of vibrations may be evaluated by using, for example, a cross-correlation method.

FIG. 7 is an example in which the propagation speed of wind in the span between the poles E-1 and E-2 is evaluated. In this example, the span between the poles E and E-1 and the span between the poles E-2 and E-3 are selected as the spans on both sides of the span of interest. Further, a difference between times at which the peak values of magnitude of vibrations are obtained at the centers of the two spans on both sides of the span of interest is evaluated (i.e., determined) as the arrival time difference of vibrations.

Note that it is assumed that the distance between the above-described selected two spans on both sides of the span of interest has already been acquired based on the laying information of the optical fiber or the position information of the poles. The distance between the two spans on both sides of the span of interest may be, for example, the distance between the centers of the two spans on both sides of the span of interest.

Therefore, for each span between poles, the wind velocity evaluation unit 11 evaluates a propagation speed v2 of wind in that span based on the arrival time difference of vibrations evaluated for that span and the distance between the selected two spans on both sides of that span.

The propagation speed (v2) of the wind may be calculated by using, for example, the below-shown expression.

$$\text{Propagation speed of wind } (v2) = \frac{\text{Distance between two spans on both sides of span of interest}}{\text{Arrival time difference of vibrations}}$$

The wind velocity evaluation unit 11 evaluates the propagation speed v2 for each of all the spans as described above. The propagation speed v2 corresponds to the propagation speed of the wind in the target span.

Next, an example of operations performed by the wind direction evaluation unit 12 will be described with reference to FIGS. 8 to 10.

For each span between poles, the wind direction evaluation unit 12 calculates a value expressed as v1/v2 by using the wind velocity v1 and the wind propagation speed v2 evaluated for that span.

Figure 8:
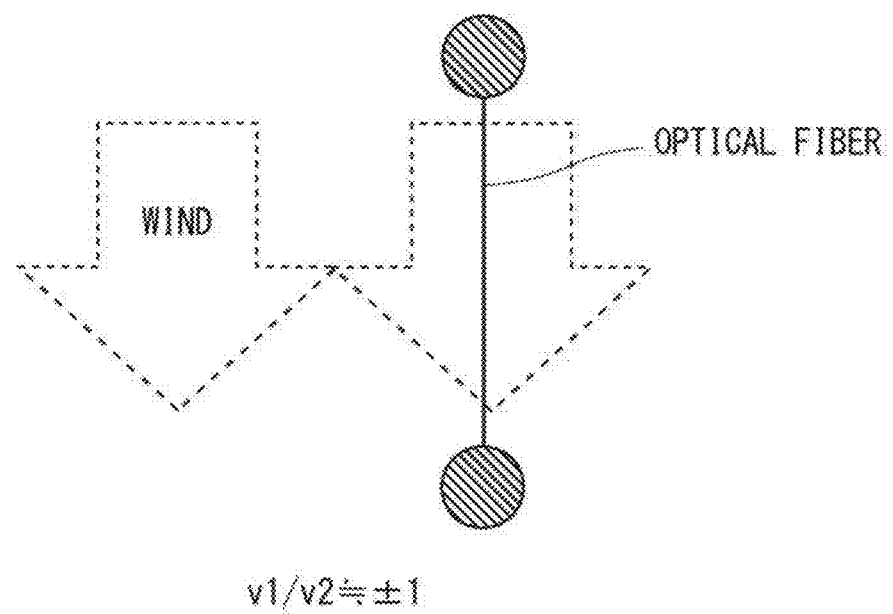
FIG. 8 shows an example of a wind direction evaluated by the evaluation apparatus according to the first example embodiment.

Note that when v1/v2≈±1, the wind direction evaluation unit 12 evaluates (i.e., determines) that the wind is propagating (i.e., blowing) roughly parallel to the optical fiber as shown in FIG. 8.

Figure 9:
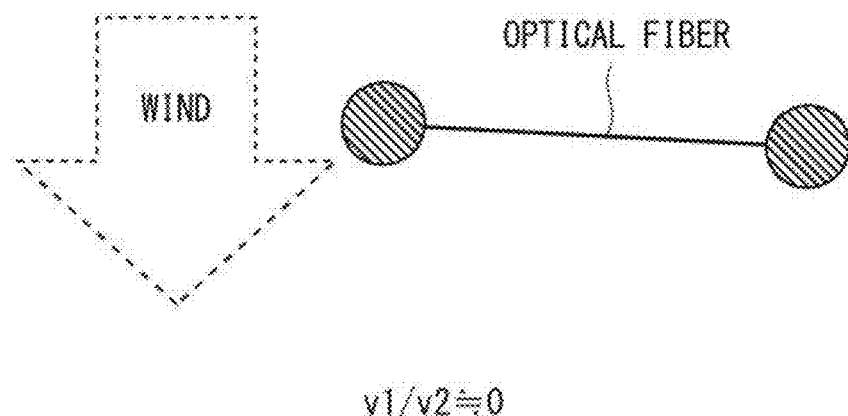
FIG. 9 shows an example of a wind direction evaluated by the evaluation apparatus according to the first example embodiment.

On the other hand, when v1/v2≈0, the wind direction evaluation unit 12 evaluates (i.e., determines) that the wind is propagating (i.e., blowing) roughly perpendicular to the optical fiber as shown in FIG. 9.

The wind direction evaluation unit 12 evaluates the value expressed as v1/v2 in each of all the spans as described above. The value expressed as v1/v2 corresponds to the wind direction in the target span.

Then, the wind direction evaluation unit 12 outputs the information about the wind velocity v1, the propagation speed v2 of the wind, and the wind direction v1/v2 in each of the spans together with the laying information of the optical fiber or the position information of the poles.

Figure 10:
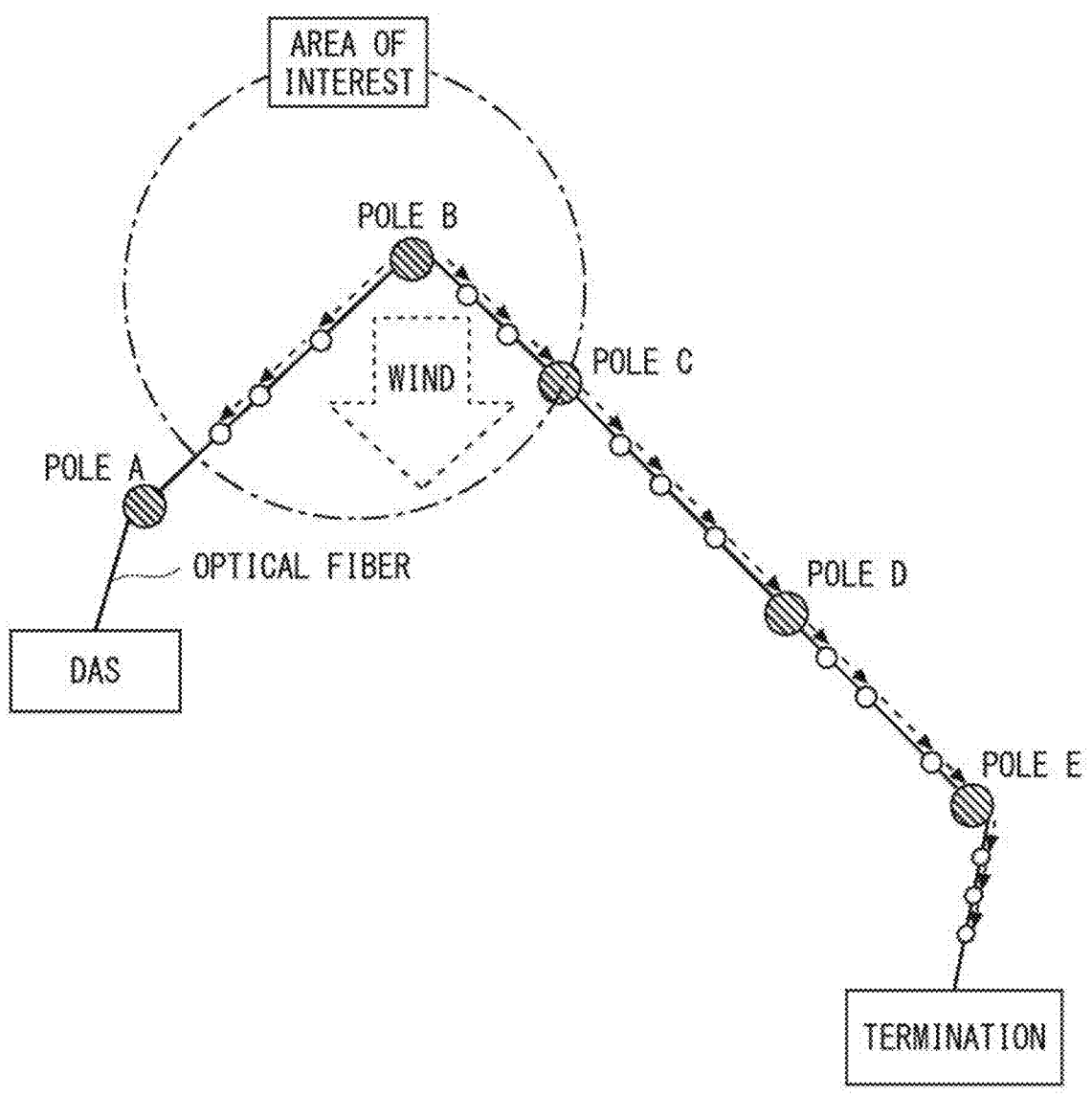
FIG. 10 shows an example of a screen image output by the evaluation apparatus according to the first example embodiment.

Note that as shown in FIG. 10, the wind direction evaluation unit 12 may create a screen image in which, by using the coordinates of the centers of respective spans as starting points, vectors (dashed arrows in the drawing) along the optical fiber are visualized, and output the created screen image.

Further, depending on the layout of the optical fiber, there may be an area in which the optical fiber is bent (or folded) roughly at a right angle, such as the area of interest shown in FIG. 10. In this case, the wind direction evaluation unit 12 may estimate a two-dimensional wind direction by adding up vectors included in the area of interest.

Next, an example of a schematic flow of operations performed by the evaluation apparatus 10 according to the first example embodiment will be described with reference to FIG. 11. Note that in this example, it is assumed that the wind velocity evaluation unit 11 has already acquired the laying information of the optical fiber or the position information of the poles.

Figure 11:
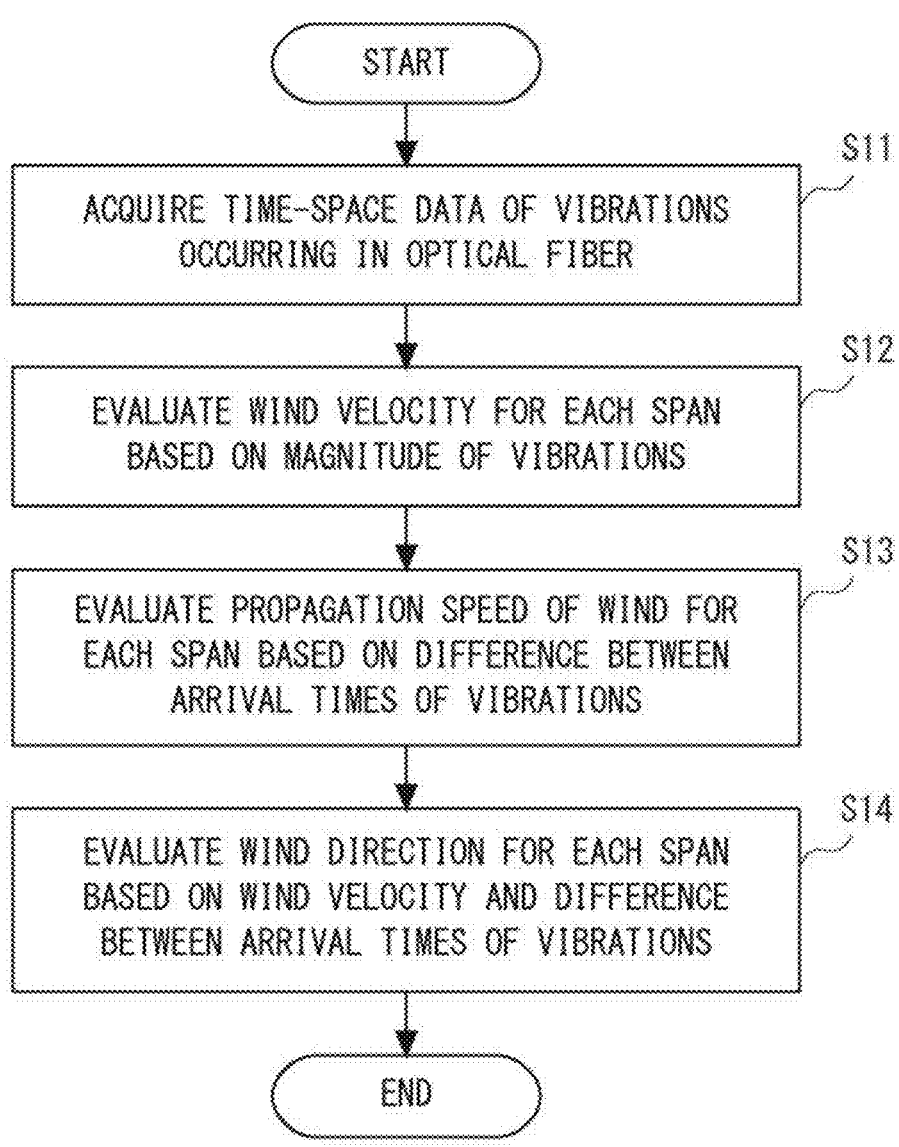
FIG. 11 is a flowchart showing an example of a schematic flow of operations performed by the evaluation apparatus according to the first example embodiment.

As shown in FIG. 11, the wind velocity evaluation unit 11 first acquires, from the DAS, time-space data on vibrations that have occurred in the optical fiber (Step S11).

Next, the wind velocity evaluation unit 11 evaluates the wind velocity in each span based on the magnitude of vibrations in that span (Step S12).

Next, the wind velocity evaluation unit 11 evaluates the propagation speed of the wind in each span based on the arrival time difference of vibrations between the two spans on both sides of that span (Step S13).

After that, the wind direction evaluation unit 12 evaluates the wind direction in each span based on the wind velocity and the propagation speed of the wind in that span (Step S14).

As described above, according to the first example embodiment, the wind velocity evaluation unit 11 acquires, from the DAS, time-space data on vibrations that have occurred in the optical fiber, evaluates the wind velocity in each span based on the magnitude of vibrations in that span, and evaluates the propagation speed of the wind in that span based on the arrival time difference of vibrations between the two spans on both sides of that span. Further, the wind direction evaluation unit 12 evaluates the wind direction in each span based on the wind velocity and the propagation speed of the wind in that span. Therefore, it is possible to detect not only the wind velocity but also the wind direction.

Further, according to the first example embodiment, when the wind velocity and the wind direction are detected, there is no need to use a special optical fiber cable like the one disclosed in Japanese Unexamined Patent Application Publication No. 2011-085540 (i.e., an optical fiber cable which includes an optical fiber, a low-resistance metal wire, and a high-resistance metal wire, and in which a notch and a connection fitting are provided). Therefore, it is possible to detect the wind velocity and the wind direction by using an existing optical fiber and an existing communication optical fiber cable.

Second Example Embodiment

A second example embodiment has a configuration similar to that of the above-described first example embodiment, but some of the operations performed in the second example embodiment are different from those performed in the first example embodiment.

Specifically, operations for evaluating a propagation speed v2 of wind in each span performed in the wind velocity evaluation unit 11 in the second example embodiment differs from those performed in the above-described first example embodiment.

Therefore, an example of operations for evaluating the propagation speed v2 of wind in each span, performed in a wind velocity evaluation unit 11 according to the second example embodiment will be described hereinafter with reference to FIG. 12.

Figure 12:
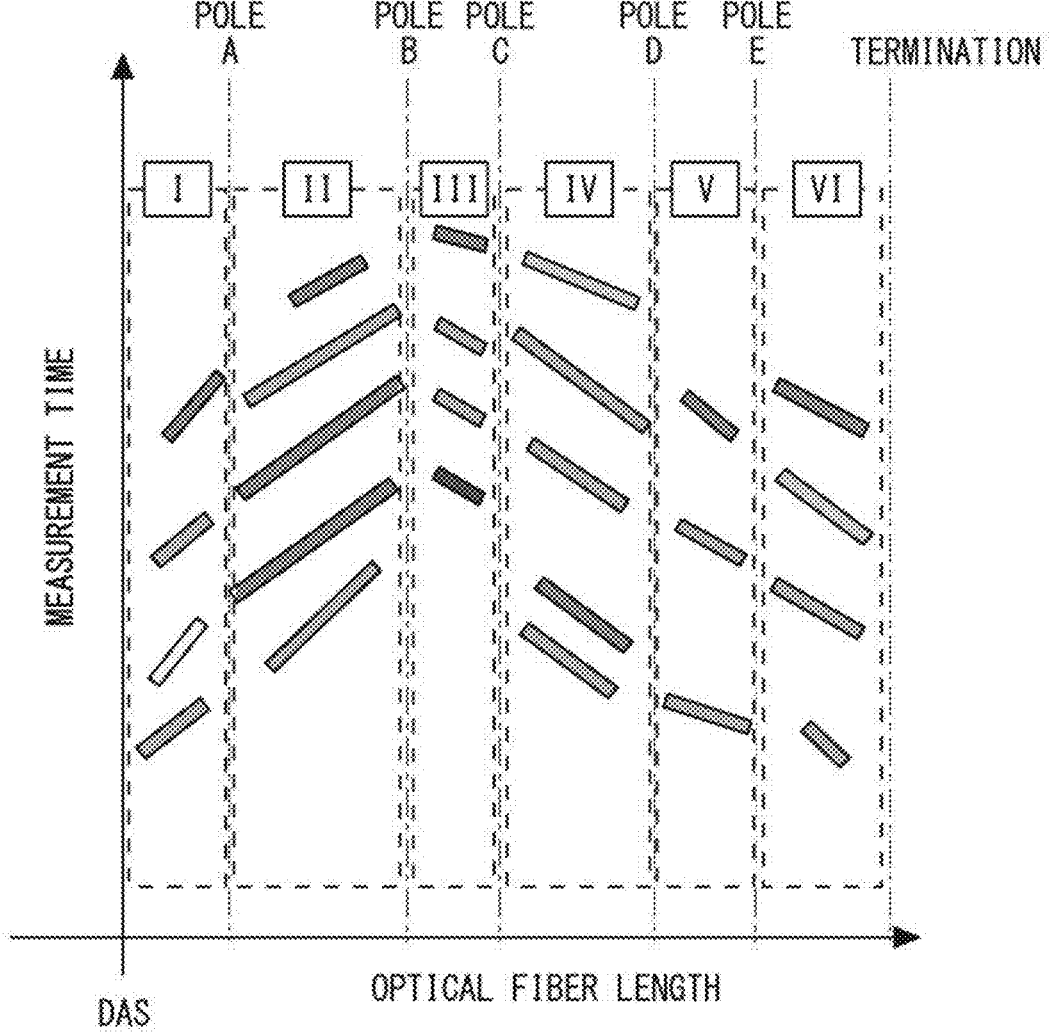
FIG. 12 shows an example of a time-space distribution of vibrations occurring in an optical fiber obtained by an evaluation apparatus according to a second example embodiment.

FIG. 12 shows an example of a time-space distribution of vibrations that have occurred in the optical fiber, obtained by an evaluation apparatus 10 according to the second example embodiment.

The wind velocity evaluation unit 11 smooths the time-space distribution of vibrations in the temporal direction and in the spatial direction. For example, a median filter can be used for the smoothing.

Further, the wind velocity evaluation unit 11 divides the analysis area into a plurality of analysis sections. In this example, it is assumed that a section between a pole including a closure and another pole including a closure (e.g., between the poles A and B) is defined as one analysis section, and the analysis area is divided into analysis sections I to VI.

Further, the wind velocity evaluation unit 11 calculates, for each of the analysis sections I to VI, an inclination(s) of a group of straight lines for the time-space distribution of vibrations in that analysis section. For example, the inclination of a straight line is calculated for each of the analysis sections I to VI as described below. Firstly, for each straight line of the time-space distribution of vibrations included in the analysis section, the inclination of the straight line is obtained by performing an edge enhancement process and a Hough transformation process. Then, the inclinations of all the straight lines in the analysis section are summarized, and an average value, a maximum value, or a minimum value of the inclinations of all the straight lines is defined as the inclination of the straight line of the time-space distribution of vibrations in the analysis section.

Further, the wind velocity evaluation unit 11 converts, for each of the analysis sections I to VI, the inclination calculated for that analysis section into a velocity. The velocity obtained by the above-described conversion corresponds to the propagation speed v2 of the wind in the target analysis section.

Through the above-described processes, the wind velocity evaluation unit 11 calculates the propagation speed v2 of each of all the analysis sections I to VI.

Note that while an analysis area between poles each including a closure is defined as one analysis section in the second example embodiment, a span between poles is defined as one analysis section regardless of whether the poles include a closure or not in the above-described first example embodiment.

Therefore, in some cases, a plurality of spans may be included in at least one of the analysis sections I to VI. In this case, for example, an average value, a maximum value, or a minimum value of the wind velocity v1 calculated for each of the plurality of spans may be calculated, and the obtained value may be defined as the wind velocity v1 in the target analysis section.

As described above, in the second example embodiment, the wind velocity evaluation unit 11 evaluates the wind velocity v1 and the propagation speed v2 of the wind in each of the analysis sections I to VI.

Therefore, the wind direction evaluation unit 12 also calculates, for each of the analysis sections I to VI, the value expressed as v1/v2 in that analysis section by using the wind velocity v1 and the propagation speed v2 of the wind evaluated in that analysis section.

As described above, according to the second example embodiment, the wind velocity evaluation unit 11 defines a section between poles each including a closure as one analysis section, and divides the analysis area into a plurality of analysis sections. Further, for each analysis section, the wind velocity evaluation unit 11 evaluates the wind velocity in that analysis section based on the magnitude of vibrations in that analysis section, and evaluates the propagation speed of the wind in that analysis section based on the inclination of the straight line of the time-space distribution of vibrations in that analysis section. Further, the wind direction evaluation unit 12 evaluates, for each analysis section, the wind direction in that analysis section based on the wind velocity and the propagation speed of the wind in that analysis section. Therefore, similarly to the above-described first example embodiment, it is possible to detect not only the wind velocity but also the wind direction. Further, other advantageous effects are also similar to those in the above-described first example embodiment.

Third Example Embodiment

A third example embodiment corresponds to an example embodiment in which the concept of the above-described first and second example embodiments is broadened.

An example of a configuration of an evaluation apparatus 20 according to the third example embodiment will be described with reference to FIG. 13.

Figure 13:
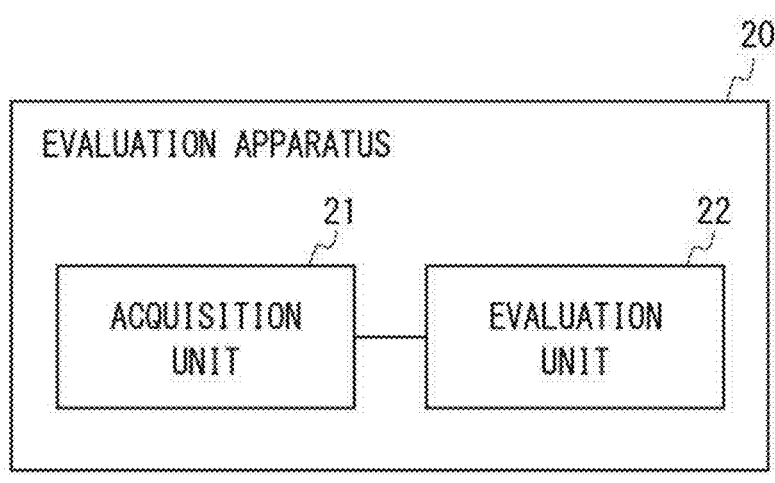
FIG. 13 is a block diagram showing an example of a configuration of an evaluation apparatus according to a third example embodiment.

As shown in FIG. 13, the evaluation apparatus 20 according to the third example embodiment includes an acquisition unit 21 and an evaluation unit 22.

The acquisition unit 21 acquires, from a sensor, time-space data on vibrations that have occurred in an overhead optical fiber strung between poles. The acquisition unit 21 corresponds to the wind velocity evaluation unit 11 in the above-described first or second example embodiment. Further, the sensor corresponds to the phase-sensitive OTDR (Phase-Sensitive Optical Time Domain Reflectometer) or the DAS (Distributed Acoustic Sensor).

The evaluation unit 22 evaluates, for each of predetermined analysis sections, a wind velocity and a propagation speed of wind in the predetermined analysis section based on time-space data on vibrations, and evaluates a wind direction in the analysis section based on the evaluated wind velocity and the propagation speed of the wind. The evaluation unit 22 corresponds to the wind velocity evaluation unit 11 and the wind direction evaluation unit 12 according to the above-described first or second example embodiment.

Since the third example embodiment is configured as described above, it is possible to detect not only the wind velocity but also the wind direction.

Note that for each of the predetermined analysis sections, the evaluation unit 22 may evaluate an arrival time difference of vibrations between two spans on both sides of that span based on the time-space data on vibrations, and evaluate the propagation speed of the wind in that analysis section based on the evaluated arrival time difference. In this case, the predetermined analysis section may be a section between poles.

Further, the evaluation unit 22 may derive a time-space distribution of vibrations representing, for each position on the optical fiber, a time at which vibrations occurred and the magnitude of the vibrations based on the time-space data on vibrations. Further, the evaluation unit 22 may evaluate, for each of the predetermined analysis sections, the inclination of the straight line of the time-space distribution of vibrations in that analysis section, and evaluate the propagation speed of the wind in that analysis section based on the evaluated inclination. In this case, the predetermined analysis section may be a section between, among the poles, poles each including a closure.

Further, the evaluation unit 22 may evaluate, for each of the predetermined analysis sections, the magnitude of vibrations in that analysis section based on the time-space data on vibrations, and evaluate the wind velocity in that analysis section based on the evaluated magnitude of vibrations.

Hardware Configuration of Evaluation Apparatus According to Example Embodiment

An example of a hardware configuration of a computer 90 that implements the evaluation apparatuses 10 or 20 according to the above-described first, second, or third example embodiment will be described with reference to FIG. 14.

Figure 14:
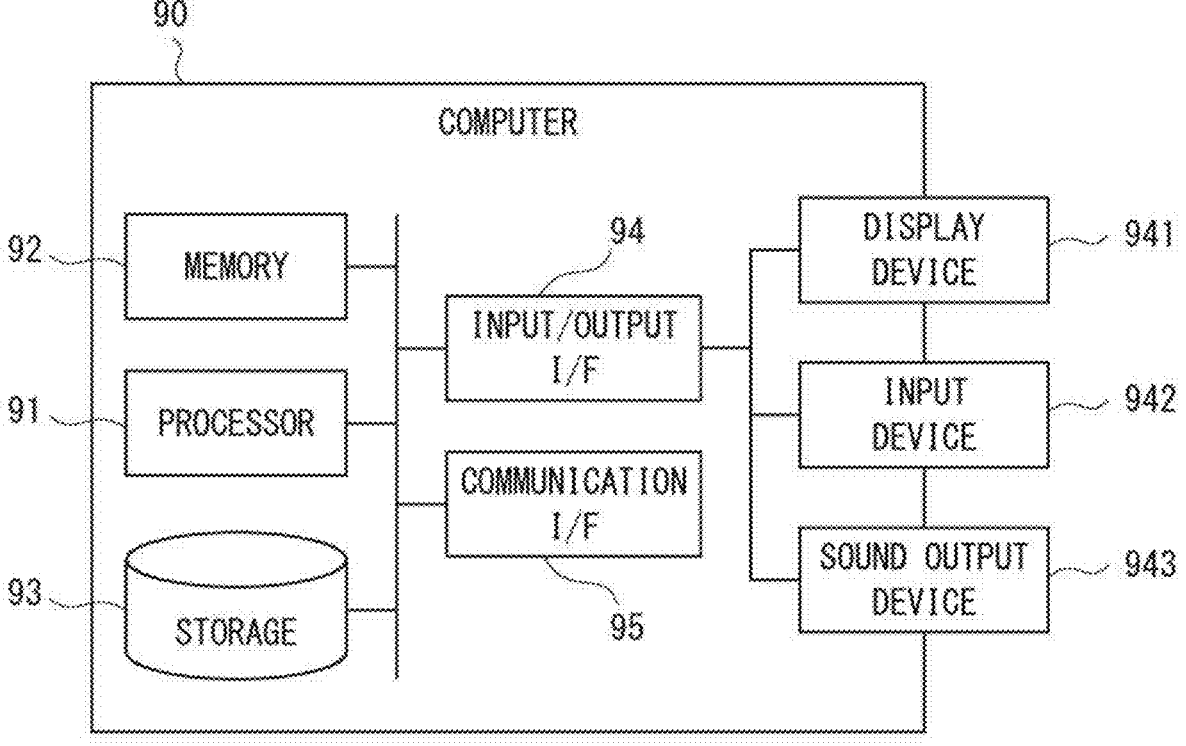
FIG. 14 is a block diagram showing an example of a hardware configuration of a computer that implements an evaluation apparatus according to an example embodiment.

As shown in FIG. 14, the computer 90 includes a processor 91, a memory 92, a storage 93, an input/output interface (input/output I/F) 94, a communication interface (communication I/F) 95, and the like. The processor 91, the memory 92, the storage 93, the input/output interface 94, and the communication interface 95 are connected to each other by data transmission lines for transmitting/receiving data to/from each other.

The processor 91 is, for example, an arithmetic processing unit such as a CPU (Central Processing Unit) or a GPU (Graphics Processing Unit). The memory 92 is, for example, a memory such as a RAM (Random Access Memory) or a ROM (Read Only Memory). The storage 93 is, for example, a storage device such as an HDD (Hard Disk Drive), an SSD (Solid State Drive), or a memory card. Further, the storage 93 may be a memory such as a RAM or a ROM.

A program(s) is stored in the storage 93. This program includes a set of instructions (or software codes) that, when being loaded into the computer 90, causes the computer to perform one or more of the functions in the above-described evaluation apparatus 10 or 20. The components in the above-described evaluation apparatus 10 or 20 may be implemented by having the processor 91 load a program(s) stored in the storage 93 and execute the loaded program(s). Further, the storing function in the above-described evaluation apparatus 10 or 20 may be implemented by the memory 92 or the storage 93.

Further, the above-described program may be stored in a non-transitory computer readable medium or a tangible storage medium. Examples of the computer readable medium or the tangible storage medium include, but are not limited to, a random-access memory (RAM), a read-only memory (ROM), a flash memory, a solid-state drive (SSD) or other memory technologies, a CD (Compact Disc)-ROM, a DVD (Digital Versatile Disc), a Blu-ray (Registered Trademark) disk or other optical disk storages, a magnetic cassette, a magnetic tape, and a magnetic disk storage or other magnetic storage devices. The program may be transmitted through a transitory computer readable medium or a communication medium. Examples of the transitory computer readable medium or the communication medium include, but are not limited to, an electrically propagating signal, an optically propagating signal, an acoustically propagating signal, or other forms of propagating signals.

The input/output interface 94 is connected to a display device 941, an input device 942, a sound (or voice) output device 943, and the like. The display device 941 is a device, such as an LCD (Liquid Crystal Display), a CRT (Cathode Ray Tube) display, or a monitor, that displays a screen (i.e., an image such as a window) corresponding to drawing data processed by the processor 91. The input device 942 is a device that receives an operation input by an operator, such as a keyboard, a mouse, and a touch sensor, or the like. The display device 941 and the input device 942 may be integrated with each other and hence implemented as a touch panel. The sound output device 943 is a device, such as a speaker, that outputs a sound (or a voice) corresponding to acoustic data processed by the processor 91.

The communication interface 95 transmits/receives data to/from an external apparatus. For example, the communication interface 95 communicates with an external apparatus through a wired or wireless communication path.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

The first, second and third embodiments can be combined as desirable by one of ordinary skill in the art.

The whole or part of the example embodiments disclosed above can be described as, but not limited to, the following supplementary notes.

Supplementary Note 1

An evaluation apparatus comprising:
at least one memory storing a set of instructions; and
at least one processor configured to execute the set of instructions and thereby to:
acquire, from a sensor, time-space data on vibrations that have occurred in an overhead optical fiber strung between poles; and
evaluate, for each of predetermined analysis sections, a wind velocity and a propagation speed of wind in the analysis section based on the time-space data, and evaluate a wind direction in the analysis section based on the evaluated wind velocity and the propagation speed of the wind.

Supplementary Note 2

The evaluation apparatus described in Supplementary note 1, wherein the at least one processor further executes the set of instructions, and thereby evaluates, for each of the predetermined analysis sections, an arrival time difference of vibrations between two sections on both sides of that analysis section based on the time-space data, and evaluates the propagation speed of the wind in that analysis section based on the evaluated arrival time difference.

Supplementary Note 3

The evaluation apparatus described in Supplementary note 2, wherein the predetermined analysis section is a section between the poles.

Supplementary Note 4

The evaluation apparatus described in Supplementary note 1, wherein the at least one processor further executes the set of instructions, and thereby derives a time-space distribution of vibrations representing, for each position on the overhead optical fiber, a time at which vibrations occurred and magnitude of the vibrations based on the time-space data, and evaluates, for each of the predetermined analysis sections, an inclination of a straight line of the time-space distribution in that analysis section, and evaluates the propagation speed of the wind in that analysis section based on the evaluated inclination.

Supplementary Note 5

The evaluation apparatus described in Supplementary note 4, wherein the predetermined analysis section is a section between, among the poles, poles each including a closure.

Supplementary Note 6

The evaluation apparatus described in Supplementary note 1, wherein the at least one processor further executes the set of instructions, and thereby evaluates, for each of the predetermined analysis sections, magnitude of vibrations in that analysis section based on the time-space data, and evaluates the wind velocity in that analysis section based on the evaluated magnitude of vibrations.

Supplementary Note 7

An evaluation method performed by an evaluation apparatus, comprising:

acquiring, from a sensor, time-space data on vibrations that have occurred in an overhead optical fiber strung between poles; and evaluating, for each of predetermined analysis sections, a wind velocity and a propagation speed of wind in the analysis section based on the time-space data, and evaluating a wind direction in the analysis section based on the evaluated wind velocity and the propagation speed of the wind.

Supplementary Note 8

The evaluation method described in Supplementary note 7, wherein in the evaluating, for each of the predetermined analysis sections, an arrival time difference of vibrations between two sections on both sides of that analysis section is evaluated based on the time-space data, and the propagation speed of the wind in that analysis section is evaluated based on the evaluated arrival time difference.

Supplementary Note 9

The evaluation method described in Supplementary note 8, wherein the predetermined analysis section is a section between the poles.

Supplementary Note 10

The evaluation method described in Supplementary note 7, wherein in the evaluating, a time-space distribution of vibrations representing, for each position on the overhead optical fiber, a time at which vibrations occurred and magnitude of the vibrations is derived based on the time-space data, and for each of the predetermined analysis sections, an inclination of a straight line of the time-space distribution in that analysis section is evaluated, and the propagation speed of the wind in that analysis section is evaluated based on the evaluated inclination.

Supplementary Note 11

The evaluation method described in Supplementary note 10, wherein the predetermined analysis section is a section between, among the poles, poles each including a closure.

Supplementary Note 12

The evaluation method described in Supplementary note 7, wherein in the evaluating, for each of the predetermined analysis sections, magnitude of vibrations in that analysis section is evaluated based on the time-space data, and the wind velocity in that analysis section is evaluated based on the evaluated magnitude of vibrations.

Supplementary Note 13

A non-transitory computer readable medium storing a program for causing a computer to perform:

an acquisition process for acquiring, from a sensor, time-space data on vibrations that have occurred in an overhead optical fiber strung between poles; and an evaluation process for evaluating, for each of predetermined analysis sections, a wind velocity and a propagation speed of wind in the analysis section based on the time-space data, and evaluating a wind direction in the analysis section based on the evaluated wind velocity and the propagation speed of the wind.

Supplementary Note 14

The non-transitory computer readable medium described in Supplementary note 13, wherein in the evaluating process, for each of the predetermined analysis sections, an arrival time difference of vibrations between two sections on both sides of that analysis section is evaluated based on the time-space data, and the propagation speed of the wind in that analysis section is evaluated based on the evaluated arrival time difference.

Supplementary Note 15

The non-transitory computer readable medium described in Supplementary note 14, wherein the predetermined analysis section is a section between the poles.

Supplementary Note 16

The non-transitory computer readable medium described in Supplementary note 13, wherein in the evaluating process, a time-space distribution of vibrations representing, for each position on the overhead optical fiber, a time at which vibrations occurred and magnitude of the vibrations is derived based on the time-space data, and for each of the predetermined analysis sections, an inclination of a straight line of the time-space distribution in that analysis section is evaluated, and the propagation speed of the wind in that analysis section is evaluated based on the evaluated inclination.

Supplementary Note 17

The non-transitory computer readable medium described in Supplementary note 16, wherein the predetermined analysis section is a section between, among the poles, poles each including a closure.

Supplementary Note 18

The non-transitory computer readable medium described in Supplementary note 13, wherein in the evaluating process, for each of the predetermined analysis sections, magnitude of vibrations in that analysis section is evaluated based on the time-space data, and the wind velocity in that analysis section is evaluated based on the evaluated magnitude of vibrations.

What is claimed is:

1. An evaluation apparatus comprising:
at least one memory storing a set of instructions; and
at least one processor configured to execute the set of instructions and thereby to:
acquire, from a sensor, time-space data on vibrations that have occurred in an overhead optical fiber strung between poles; and
evaluate, for each of predetermined analysis sections, a wind velocity and a propagation speed of wind in the analysis section based on the time-space data, and evaluate a wind direction in the analysis section based on the evaluated wind velocity and the propagation speed of the wind.

2. The evaluation apparatus according to claim 1, wherein the at least one processor further executes the set of instructions, and thereby evaluates, for each of the predetermined analysis sections, an arrival time difference of vibrations between two sections on both sides of that analysis section based on the time-space data, and evaluates the propagation speed of the wind in that analysis section based on the evaluated arrival time difference.

3. The evaluation apparatus according to claim 2, wherein the predetermined analysis section is a section between the poles.

4. The evaluation apparatus according to claim 1, wherein the at least one processor further executes the set of instructions, and thereby
derives a time-space distribution of vibrations representing, for each position on the overhead optical fiber, a time at which vibrations occurred and magnitude of the vibrations based on the time-space data, and
evaluates, for each of the predetermined analysis sections, an inclination of a straight line of the time-space distribution in that analysis section, and evaluates the propagation speed of the wind in that analysis section based on the evaluated inclination.

5. The evaluation apparatus according to claim 4, wherein the predetermined analysis section is a section between, among the poles, poles each including a closure.

6. The evaluation apparatus according to claim 1, wherein the at least one processor further executes the set of instructions, and thereby evaluates, for each of the predetermined analysis sections, magnitude of vibrations in that analysis section based on the time-space data, and evaluates the wind velocity in that analysis section based on the evaluated magnitude of vibrations.

7. An evaluation method performed by an evaluation apparatus, comprising:
acquiring, from a sensor, time-space data on vibrations that have occurred in an overhead optical fiber strung between poles; and
evaluating, for each of predetermined analysis sections, a wind velocity and a propagation speed of wind in the analysis section based on the time-space data, and evaluating a wind direction in the analysis section based on the evaluated wind velocity and the propagation speed of the wind.

8. The evaluation method according to claim 7, wherein in the evaluating, for each of the predetermined analysis sections, an arrival time difference of vibrations between two sections on both sides of that analysis section is evaluated based on the time-space data, and the propagation speed of the wind in that analysis section is evaluated based on the evaluated arrival time difference.

9. The evaluation method according to claim 8, wherein the predetermined analysis section is a section between the poles.

10. The evaluation method according to claim 7, wherein in the evaluating,
a time-space distribution of vibrations representing, for each position on the overhead optical fiber, a time at which vibrations occurred and magnitude of the vibrations is derived based on the time-space data, and
for each of the predetermined analysis sections, an inclination of a straight line of the time-space distribution in that analysis section is evaluated, and the propagation speed of the wind in that analysis section is evaluated based on the evaluated inclination.

11. The evaluation method according to claim 10, wherein the predetermined analysis section is a section between, among the poles, poles each including a closure.

12. The evaluation method according to claim 7, wherein in the evaluating, for each of the predetermined analysis sections, magnitude of vibrations in that analysis section is evaluated based on the time-space data, and the wind velocity in that analysis section is evaluated based on the evaluated magnitude of vibrations.

13. A non-transitory computer readable medium storing a program for causing a computer to perform:
an acquisition process for acquiring, from a sensor, time-space data on vibrations that have occurred in an overhead optical fiber strung between poles; and
an evaluation process for evaluating, for each of predetermined analysis sections, a wind velocity and a propagation speed of wind in the analysis section based on the time-space data, and evaluating a wind direction in the analysis section based on the evaluated wind velocity and the propagation speed of the wind.

14. The non-transitory computer readable medium according to claim 13, wherein in the evaluating process, for each of the predetermined analysis sections, an arrival time difference of vibrations between two sections on both sides of that analysis section is evaluated based on the time-space data, and the propagation speed of the wind in that analysis section is evaluated based on the evaluated arrival time difference.

15. The non-transitory computer readable medium according to claim 14, wherein the predetermined analysis section is a section between the poles.

16. The non-transitory computer readable medium according to claim 13, wherein in the evaluating process,
a time-space distribution of vibrations representing, for each position on the overhead optical fiber, a time at which vibrations occurred and magnitude of the vibrations is derived based on the time-space data, and for each of the predetermined analysis sections, an inclination of a straight line of the time-space distribution in that analysis section is evaluated, and the propagation speed of the wind in that analysis section is evaluated based on the evaluated inclination.

17. The non-transitory computer readable medium according to claim 16, wherein the predetermined analysis section is a section between, among the poles, poles each including a closure.

18. The non-transitory computer readable medium according to claim 13, wherein in the evaluating process, for each of the predetermined analysis sections, magnitude of vibrations in that analysis section is evaluated based on the time-space data, and the wind velocity in that analysis section is evaluated based on the evaluated magnitude of vibrations.

\* \* \* \* \*